United States Patent [19]
Mokdad et al.

[11] Patent Number: 5,823,311
[45] Date of Patent: Oct. 20, 1998

[54] FLYWHEEL, IN PARTICULAR FOR MOTOR VEHICLES

[75] Inventors: Ayman Mokdad; Giovanni Grieco, both of Saint-Ouen, France

[73] Assignee: Valeo, Paris, France

[21] Appl. No.: 564,067

[22] PCT Filed: Apr. 13, 1995

[86] PCT No.: PCT/FR95/00482

§ 371 Date: Dec. 14, 1995

§ 102(e) Date: Dec. 14, 1995

[87] PCT Pub. No.: WO95/28580

PCT Pub. Date: Oct. 26, 1995

[30] Foreign Application Priority Data

Apr. 14, 1994 [FR] France .................................. 94-04439

[51] Int. Cl.[6] ................................................. F16F 15/12
[52] U.S. Cl. ..................... 192/70.17; 74/574; 192/212; 192/214.1
[58] Field of Search .............................. 192/70.17, 214.1, 192/212; 74/574; 464/62

[56] References Cited

U.S. PATENT DOCUMENTS

| | | |
|---|---|---|
| 1,984,577 | 12/1934 | Griswald . |
| 3,499,512 | 3/1970 | Maurice . |
| 4,362,230 | 12/1982 | Martinex Corral . |
| 4,662,239 | 5/1987 | Worner et al. .................... 192/70.17 X |
| 4,856,636 | 8/1989 | Meinhard .............................. 192/70.17 |
| 4,972,734 | 11/1990 | Hyodo et al. .................... 192/70.17 X |
| 4,996,892 | 3/1991 | Yamamoto ....................... 192/70.17 X |
| 5,120,276 | 6/1992 | Maucher et al. . |
| 5,367,920 | 11/1994 | Bonfilio ........................... 192/70.17 X |
| 5,533,815 | 7/1996 | Schierling et al. .............. 192/70.17 X |

FOREIGN PATENT DOCUMENTS

| | | |
|---|---|---|
| 2554890 | 5/1985 | France . |
| 2579709 | 10/1986 | France . |
| 2631409 | 11/1989 | France . |
| 4341373 | 6/1994 | Germany . |

*Primary Examiner*—Rodney H. Bonck
*Attorney, Agent, or Firm*—Longacre & White

[57] ABSTRACT

A flywheel comprising a first and second coaxial body (1, 2) movably mounted in relation to one another against an elastic member (8) and friction device (50, 150). The first body (1) is mounted to a drive shaft while the second body (2) includes a reaction plate (21) for a friction clutch. The first body (1) includes a member (60) on its outer periphery, a stiffener, extending close to the second body (2). The friction devices (50, 150) are inserted between the member (60) and the second body (2). The flywheel is adapted for use with a motor vehicle.

5 Claims, 9 Drawing Sheets

FLYWHEEL, IN PARTICULAR FOR MOTOR VEHICLES

BACKGROUND OF THE INVENTION

1. Field of the Invention

The present invention relates to damped flywheels, especially for a motor vehicle, of the kind comprising two coaxial masses mounted for movement of one with respect to the other against the action of resilient means and friction means.

2. Description of the Prior Art

Such a damped flywheel, which is also referred to as a double damped flywheel, is described for example in the document FR-A-2 565 650 (U.S. Pat. No. 5,120,276).

In that document, the friction device is interposed operatively between the first mass (i.e. a plate of the latter), which is adapted to be fixed to a drive shaft (i.e the crankshaft of the engine of the vehicle), and a disc fixed on the second mass, which comprises a reaction plate for a friction clutch, at the inner periphery of the damped flywheel. The second mass is mounted for rotation on the first mass through an interposed bearing.

It is consequently necessary to machine the appropriate part of the plate of the first mass.

This type of friction device is also well adapted for resilient means which work circumferentially between the two masses.

It is not suitable for damped flywheels in which the resilient means work in a generally radial direction between the two masses.

In general, it can be desirable, regardless of the type of resilient means employed, to avoid locating the said friction device in the vicinity of the plate of the first mass.

An object of the present invention is to provide a friction device which is capable of being used with any type of resilient means, and which does not involve the plate of the first mass.

SUMMARY OF THE INVENTION

According to the invention, a damped flywheel of the type defined above is characterised in that the first mass carries a stiffening member fixed to its outer periphery and lying close to the second mass, and in that the friction means are located between the said member and the said second mass.

With this arrangement, use can be made of the space that exists between the said member and the plate of the first mass, in order to mount therein resilient means which work either generally radially between the two masses, or circumferentially between these latter.

It is thus possible easily to fix the first mass on to the crankshaft of the engine, especially when the bearing which is interposed between the two masses is of reduced size, with its outer diameter being smaller than the diameter of the fastening holes.

The said member may be used for the mounting of circumferentially acting resilient means, and to provide a base on which pivot pins are mounted.

It will be appreciated that this member stiffens the first mass, which conventionally carries at this location a cantilevered skirt which is oriented generally axially.

The friction means play a part in the stiffening of the first mass, because in general terms they constitute a spacing means interposed between the second mass and the stiffening member.

According to one feature, the friction means are interposed operatively between one of the inner and outer peripheries of the said member and the second mass.

Where the said means work at the outer periphery, the friction torque is thereby able to be increased.

Where the said means work at the inner periphery, the inertia of the second mass can be increased.

The said member preferably includes, at the appropriate one of its peripheries, an axially oriented flange which has at its free end lugs which are bent back radially, either towards the axis of the assembly or away from the axis of the assembly, as the case may be.

This flange has slots which define mortices.

This enables at least one friction ring and an axially acting resilient ring to be fitted between the lugs and the transverse portion of the said member. The friction ring is then arranged to be mounted in rotation, optionally with a clearance, on the second mass, while the axially acting resilient ring bears directly or indirectly on the lugs of the stiffening member so as to act on an application ring which has tenons engaging with the mortices in the axial flange of the stiffening member.

The friction ring is thus gripped between the transverse portion of the member and the application ring, and an assembly is obtained which cannot be mislaid, which can readily be handled and transported, and which comprises the stiffening member in accordance with the invention together with the above mentioned rings.

The second mass thus has meshing means for meshing with the friction ring, optionally with a clearance.

The following description illustrates the invention with reference to the attached drawings, in which:

DETAILED DESCRIPTION OF THE PREFERRED EMBODIMENT

Figure 1:
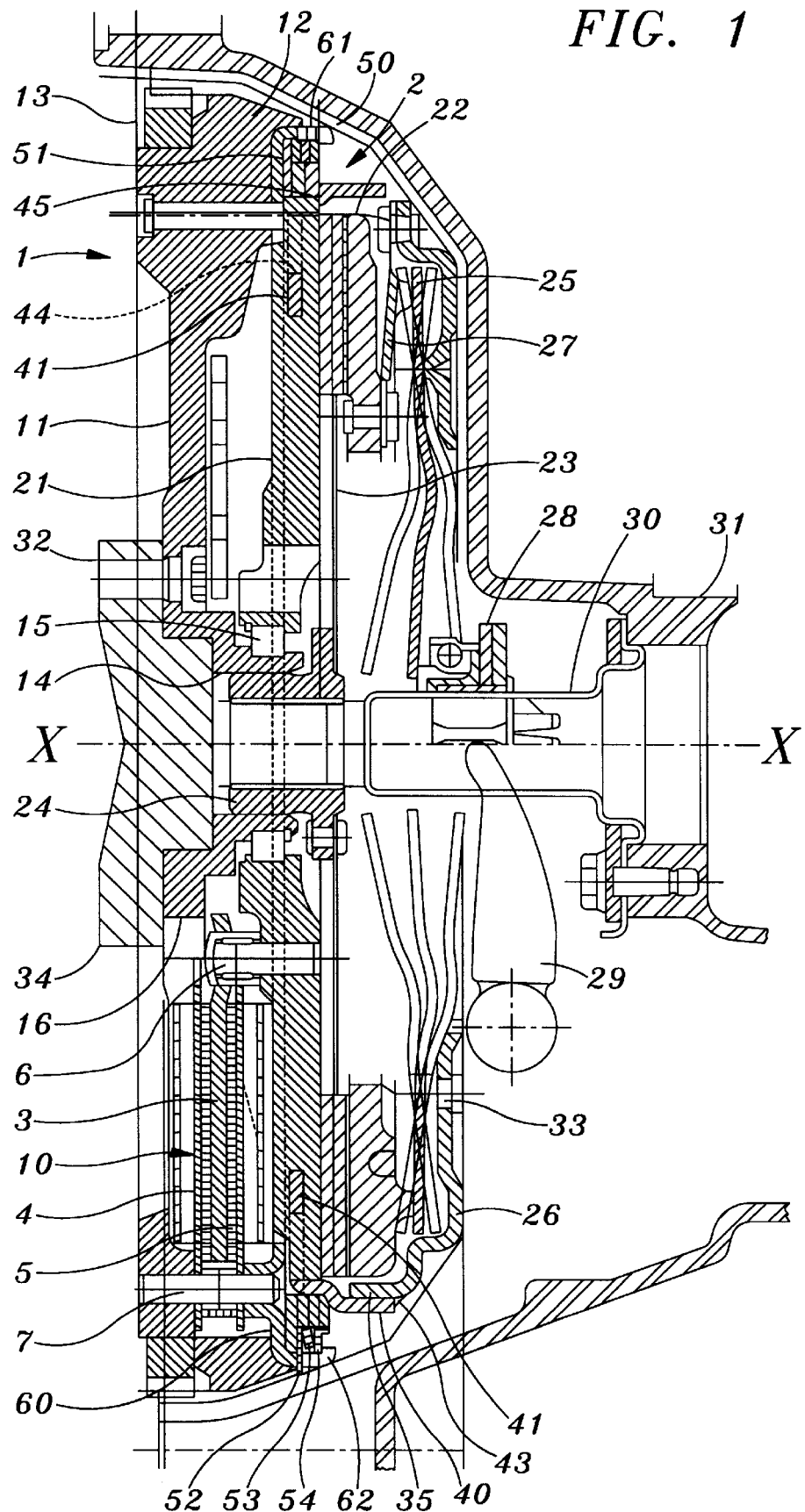
FIG. 1 is a view of a friction clutch equipped with a damped flywheel in accordance with the invention, shown in axial cross section taken on the line 1—1 in FIG. 2.
Figure 2:
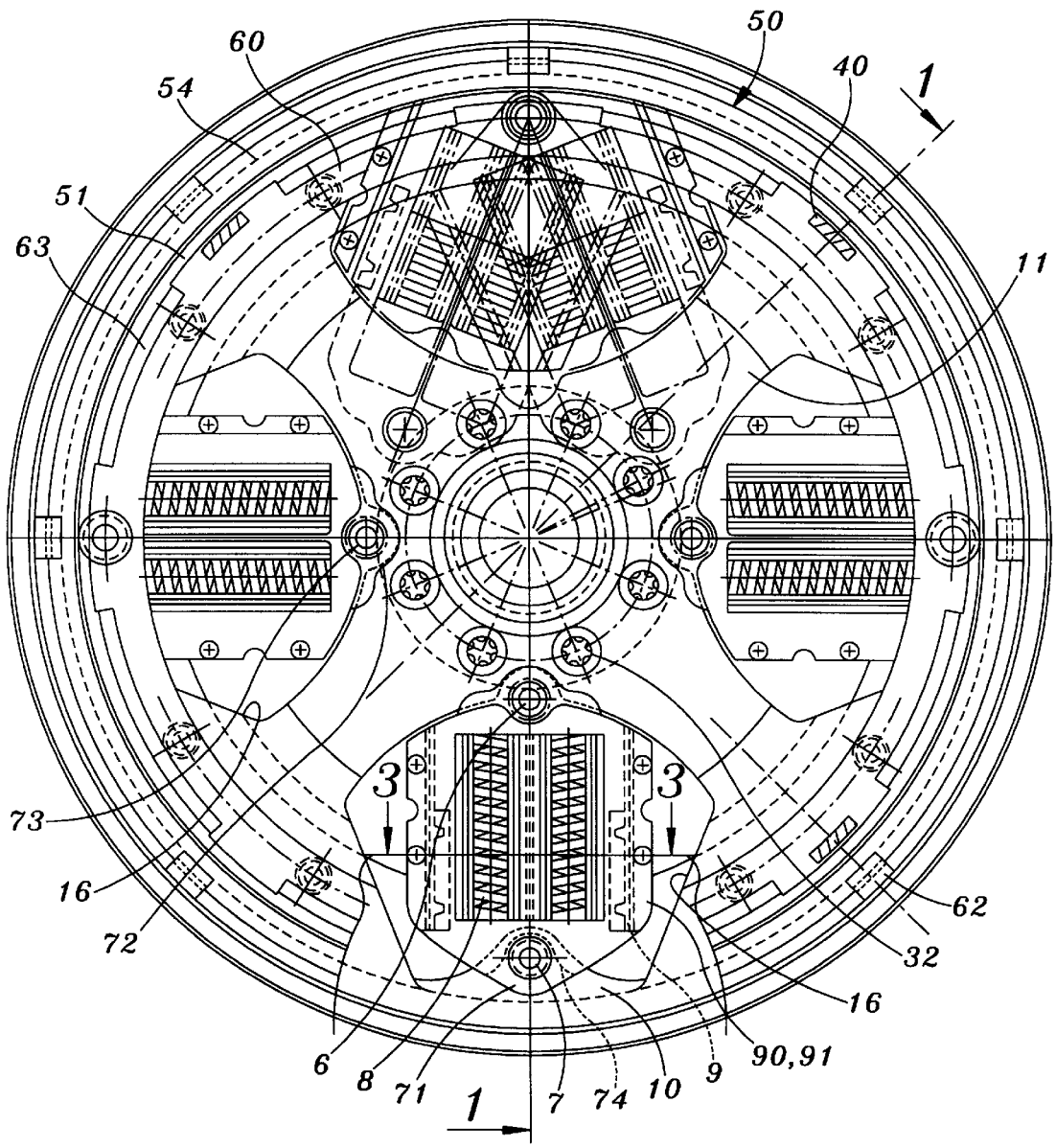
FIG. 2 is a front view, shown partly cut away, of a friction clutch without its reaction and pressure plates, and without its friction disc.
Figure 3:
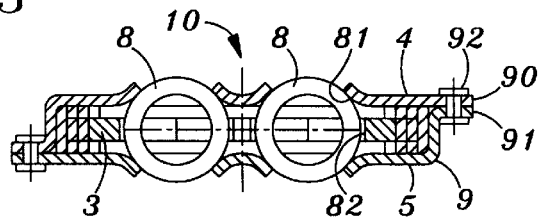
FIG. 3 is a view in cross section taken on the line 3—3 in FIG. 2.

FIGS. 1 to 3 show a torsion damping device comprising two coaxial parts 1, 2 which are mounted for movement of one with respect to the other against the action of resilient means 8 which are part of a resilient damping device.

This device is part of a damped flywheel for a motor vehicle.

The first part 1 consists of a plate 11, while the second part 2 again consists of a plate, 21, which extends parallel to the plate 11. The plates 11 and 21 are made of a mouldable material, typically in the form of a casting, in order to increase their inertia. In a modification, they may be aluminium based, the choice of material being dependent on the application.

As a general rule, and in a manner known per se, the molten metal is poured into a mould.

The two parts 1, 2 thus consist of coaxial masses, one of which rotates with respect to the other about the axial axis of symmetry X—X of the clutch.

The second mass 2 is mounted for rotation on a tubular hub 14 carried by the first mass 11. In this example, the hub 14 is integral with the plate 11, though in a modification it may be carried on the latter, while a bearing 15, which is a ball bearing in this example but which may, in a variant, be a plain bearing, is interposed between the outer periphery of the hub 14 and the inner periphery of the plate 21.

The second mass 2, which is mounted for rotation on the mass 1 through the interposed bearing 15, constitutes the reaction plate of a friction clutch which includes, in the manner known per se, a pressure plate 22, a diaphragm 25 and a cover plate 26.

By contrast with a conventional arrangement in which an engine flywheel constitutes the reaction plate of the clutch, the flywheel is here divided into two parts in a manner to be explained below.

The reaction plate 21 of mouldable material includes a fastening insert 40, 41 which is anchored in the mass of the said plate 21, being nested into the latter. The said insert 40, 41 has a projecting fastening zone 40 in the vicinity of the outer periphery of the reaction plate 21, for fastening the cover plate 26 of the friction clutch so as to constitute a friction device in accordance with one feature of the invention.

In this example the pressure plate 22, typically in the form of a casting, is coupled to the cover plate 26 with axial mobility, in the manner known per se, by means of inclined resilient tongues 27, each of which is fastened at one of its ends to the cover plate, and at its other end to a lug of the pressure plate 22.

This fastening is obtained by riveting in this example.

The diaphragm 25 is mounted on the cover plate 26 for tilting deflection, in this example by virtue of stub pieces 33, one of which can be seen in the lower part of FIG. 1. This stub piece has a head with which the diaphragm is arranged to engage, and which is aligned with a press formed depression formed in the base of the cover plate.

For more detail, reference should be made to the document FR-A-1 524 350 (U.S. Pat. No. 3,499,512).

In a modification, it is possible to use an articulation with two rings which are carried by the stub pieces, or arrangements in which washers are carried by lugs projecting from the cover plate and formed by pressing out and bending.

The diaphragm 25 bears on the base of the cover plate 26 in order to urge the pressure plate 22 towards the reaction plate 21. The friction clutch further includes a friction disc 23 connected to a central hub 24, which is mounted in rotation on the input shaft (not shown) of the gearbox by means of a splined coupling.

It will be recalled that the assembly of the components 26, 25, 24, 27 constitutes a unitary clutch mechanism, this being seamed by means of its dished cover plate on to the reaction plate 21, by virtue of the inserts 40, 41 in accordance with the invention.

The friction liners which are carried by the disc 23 at its outer periphery are normally gripped under the action of the diaphragm between the plates 21, 22, so that the clutch is normally engaged.

In order to declutch, the clutch being of the push to release type in this example, it is necessary to exert a thrust on the ends of the fingers of the diaphragm 25 by means of a clutch release bearing 28, thus disengaging the clutch.

To this end, the release bearing 28 is mounted for axial movement along a tube guide 30 which is fixed to the gearbox 31, and through which the input shaft of the latter extends.

The said release bearing 28 is controlled by a declutching fork 29 which causes it to be displaced axially to the left in FIG. 1, thus causing the diaphragm to be deflected in a tilting movement, several positions of which are shown in FIG. 1.

The first rotating mass 11 is arranged to be connected, through its inner periphery, in this example by means of screws 32, to a driving shaft which is here the crankshaft 34 of the internal combustion engine of the motor vehicle, while the second rotating mass 2 is coupled in rotation, through the clutch mechanism 22, 25, 26, 27 and the disc 23, to a driven shaft, which in this case is the input shaft of the gearbox of the vehicle.

The first mass 1 in the form of a plate consists essentially of a central portion 11, oriented transversely and being in the form of a plate or wheel disc, which is extended at its outer periphery by an integral, axially oriented, cylindrical skirt portion 12.

The said mass 1 carries at its outer periphery a starter crown 13 which is arranged to be driven by the pinion of a starter (not shown).

The inner portion of the mass 1 is provided with a plurality of holes, through which pass the screws 32 that fasten the mass 1 to the crankshaft 34.

It will be noted that the reaction plate 21 has corresponding holes which enable a tool to be passed through them for tightening the screws 32, and that the rolling bearing 1 5 lies radially inwardly of the screws 32 and of the said holes, and is of a reduced size.

In this example, the insert 40, 41 is of metal plate and is press formed.

This insert has a transverse portion 41, which is nested, and thus anchored firmly, in the transverse main portion of the reaction plate 21.

This portion 41 if formed with a plurality of holes 44 in order to improve the anchorage.

At its outer periphery, the said portion 41 is extended towards the base of the cover plate 26 by an axially oriented cylindrical portion 40, which may be divided into lugs and which constitutes the fastening zone. The portion 40 projects axially with respect to the friction surface of the reaction plate, and extends radially outwards beyond the outer periphery of the plate 21 (in the vicinity of the latter), and is therefore spaced away from the friction liners of the disc 23 and from the pressure plate 22 which they surround. The friction surface which is offered by the plate 21 to the friction liners of the disc 23 can thus extend as far as the outer edge of the plate 21. The cover plate 26, which is of press formed sheet metal in this example, has at its outer periphery an axially oriented flange 35, which is of divided form in this embodiment.

The flange 35 is cylindrical, and is arranged to cooperate in sliding engagement with the inner periphery of the portion 40, which constitutes a centring element.

The flange 35 is thus interposed between the portion 40 and the outer periphery of the pressure plate 22. The flange 35 is in intimate contact with the portion 40.

It is therefore possible to engage the cover plate 26 telescopically within the portion 40 by a variable amount.

It is of course possible to reverse the structure, with the flange then surrounding the portion 40, cooperating with the outer periphery of the latter. In all cases, the portion 40 constitutes a guiding and centring element for the flange 35, and therefore for the cover plate 26.

In this way, the inclination and/or the load of the diaphragm 25 is able to be precisely controlled with respect to a datum, which is here the crankshaft 34 of the engine of the vehicle.

Once the diaphragm has attained the desired inclination or load, fastening of the cover plate is carried out, in this example on the free end of the fastening zone 40 of the insert, this fastening being obtained here by welding to give a band 43 of weld metal.

Once the flange 35 embraces the portion 40, the welding operation is carried out along the free edge of the flange. In a modified version, the fastening operation may consist of adhesive bonding.

In this example, the resilient means of the resilient damping device comprise at least one resilient member 8, and are interposed generally radially between the plates 11 and 21.

In the present case, resilient members are mounted in at least one articulated cassette 10 (FIGS. 2 and 3), which comprises, firstly, a damper plate 3 formed with first housings 82 for mounting of the resilient members 8 therein, and secondly, two guide members 4, 5 disposed on either side of the said damper plate and having, in facing relationship with the first housing 82, second housings 81, for mounting the said resilient members 8, which consist, in this example of two coil springs, and which may optionally be mounted in the housings 81, 82 in pairs.

In this example, two housings 81, 82, parallel to each other, are therefore provided. It is of course possible to arrange a single spring in each cassette, and therefore to provide a single housing 81.

In a modification, a larger number of housings, and therefore of springs 8, may be provided in each cassette.

The guide members 4, 5 are fixed to each other laterally. The damper plate 3 and the guide members 4, 5 are mounted in a head to toe configuration, with the said damper plate having, at one of its outer and inner peripheries, a first projecting element 72 for mounting a first articulating means 6 on a first one of the said masses 11, 12, while the guide members 4, 5 have, at their outer or inner periphery, a second projecting element 71, in facing relationship with each other, for mounting a second articulating means 7 on the other one of the said masses.

The said second projecting elements 71 and first projecting elements 72 are offset radially from each other.

In this example, the first housings 82 and second housings 81 consist of radially oriented windows, with the second housings 81 being formed with lips.

In a modification, the first housing may consist of a radially oriented slot which is open radially on the opposite side from the first projecting element.

In a modification, the second housings 81 may consist of pressformed depressions.

In every case, however, the guide members 4, 5 have flanges 90, 91 at their outer periphery for fastening them together, in this example with the aid of rivets 92.

The said guide members 4, 5 are thus fixed laterally to each other by riveting.

In a modification, they may be fixed to each other, in their flanges, by welding or by clipping.

In this example, two coil springs 8 are mounted parallel to each other within the said cassette, and the damper plate 3 is articulated at its inner periphery on the plate 21, while the guide members 4, 5 are articulated at their outer periphery on the plate 11. Each of the members 4, 5 has, adjacent to the projecting elements 72, a notch 73 which is semicircular in this example, so that a pivot pin 6, to be described later herein, can extend through it, which enables the springs 8 to be increased in length.

The same is true for the damper plate 3, which has, adjacent to the second projecting elements 71, a notch 74 which is semicircular in this example, so that a pivot pin 7, to be described later herein, can extend through it.

Accordingly, the springs 8 are of maximised length.

More precisely, the damper plate 3 is articulated on the plate 21 (at the inner periphery of the latter) by means of a pivot pin 6 having a shouldered head which is fixed, in this example by force fitting, on the plate 21, and which is surrounded by a needle bearing 171, which is interposed between the said pivot pin and a bush (or sleeve) 170 fixed on the damper plate 3.

In a modification, a plain bearing may be used.

The said bush 1 70 extends axially between the plates 11 and 21, being secured to the damper plate 3 by welding in the present case.

The members 4, 5 are articulated at their outer periphery by means of a pivot pin 7, which is force fitted into the plate 11 and into a member 60, at the outer periphery of the plate 21.

The pivot pin 7, like the pivot pin 6, is surrounded by a needle bearing interposed between the said pivot pin and a sleeve which is fixed, in this example by welding, to the guide members 3, 4 [sic].

The sleeve and the needle bearing are interposed axially between the plate 11 and the member 60, which is formed with a chimney portion for receiving the pivot pin 7.

Figure 14:
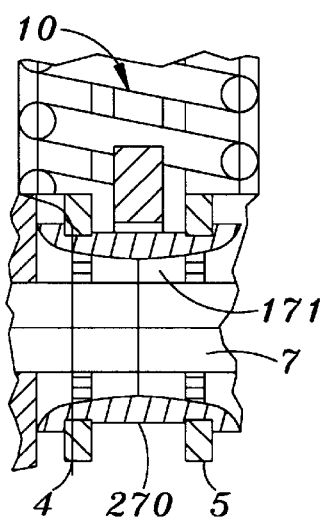
FIG. 14 is a partial view of yet a further variant of the articulating means.

In a modification (FIG. 14), the sleeve 270 may be carried on the members 4, 5 by being seamed on to them. To this end, the sleeve has a central portion of enlarged diameter, extending between the two members 4, 5 and offering a shoulder to these latter. The ends of the sleeve are upset so as to fasten it, by seaming, to the members 4, 5. The sleeve 270 is mounted on the needle bearing 171.

The plate 11 is formed with an aperture 1 6 opposite each cassette 10, so as to reduce the overall axial size and to improve ventilation. The inner edge (FIG. 2) of the aperture 16 is circular, to enable the cassettes 10 to move.

In this example, the resilient damping device has four articulated cassettes 10, while four pivot pins 6, 7, spaced apart at regular intervals, are provided as shown in FIG. 2. This number does of course depend on the application.

The member 60, the main portion of which is oriented transversely, is fixed, in this example by riveting, to the outer periphery of the plate 11, and more precisely on the portion 12 of the latter. The said member 60 is oriented transversely.

The said member 60, which is of metal plate in this example, then serves to stiffen the plate 11 which is perforated by the through apertures 16. This member 60, with the plate 11, defines a support in which the pivot pins 7 are mounted. For convenience, the member 60 will be referred to as the stiffening member.

According to the invention, the member 60 has at its outer periphery an axially oriented flange formed with slots 61 which constitute mortices, and with lugs 62 at its free end. The lugs 62 are bent back radially towards the axis of the assembly.

The member 60 lies close to the first mass, and is accordingly shaped in the form of a comb before the lugs 62 are bent back.

Situated between the outer periphery of the transverse portion of the member 60 and the lugs 62, there are, in axial succession, a friction ring 51, an application ring 52, an axially acting resilient ring 53 which is a Belleville ring in this example, but which may in a modified version be a diaphragm or a corrugated ring, and finally an abutment member 54 in contact with the lugs 62.

The application ring 52 has at its outer periphery radial lugs which constitute tenons, and which are engaged in the slots 61 of the member 60. The ring 52 is thus coupled in rotation, optionally with a clearance, with the member 60 through a coupling of the tenon and mortice type.

The member 51 is made of a friction material, and has a cross section which is generally in the form of an inverted L. It is preferably made of a mouldable material, for example a plastics material.

The member 51 has, at its inner periphery, local bosses 63 which are engaged, with or without a circumferential clearance, in local recesses 45 formed in the junction zone where the fastening zone 40 joins the anchor zone 41 of the fastening insert 40, 41.

The recesses 45 are directed towards the axis of the assembly, being in contact with the outer periphery of the reaction plate 2. For this reason the bosses 63 are chamfered.

Thus, by virtue of the member 60 and the fastening insert 40, 41, according to the invention a hysteresis device 50 is provided which works between the member 40, 41 and the member 60, the said device comprising, firstly, the rings 52, 53, 54 which are mounted in rotation on the member 60 through the member 52, and secondly, the friction member 51 which is mounted in rotation, optionally with a clearance, on the member 40 and therefore on the plate 21. The device 50 thus constitutes an axially acting friction means acting between the two masses 1, 2 by virtue, according to the invention, of the member 60 and the reaction plate 21.

This device enables the inertia of the damped flywheel to be increased, because it works at the outer periphery of the masses 1, 2, leaving intact the axial space between the two plates 11 and 21. It is therefore possible to employ a bearing 1 5 of reduced size, and to tighten the screws 32.

During the relative movement between the two masses 1, 2, the springs 8, and therefore the cassettes 10, become inclined as is shown in the upper part of FIG. 2, with relative movement between the members 51 and 60 giving rise to friction.

As can be best seen in FIG. 3, the thickness of the reaction plate 21 is reduced at its outer periphery, so as to accommodate the member 60. Its leading surface, facing towards the plate 11, is thus relieved.

According to one feature, the outer periphery of the member 60, and the rings 51, 52, 53, 54, lie within the thickness of the plate 61.

The two concentric masses 1, 2 are, in this way, mounted for movement of one with respect to the other against the action of radially acting resilient means 8 and of axially acting friction means 50.

During the declutching operation, the ring 53 works against the declutching force, and thus relieves the bearing.

It will also be noted that two friction pads 9 are interposed operatively between the lateral edges of the damper plate 3 and the lateral edges of the guide members 4, 5.

These pads 9 include bosses which are engaged in slots formed in the lateral edges of the damper plate 3. The pads 9 overlie the edge of the damper plate 3.

Thus, there is an additional friction effect during the relative movement between the two masses 1, 2, with the pads guiding the damper plate 3 during its relative movement with respect to the members 4, 5. In this way any risk of jamming is avoided.

It will be noted that the insert 40, 41 thus has a transversely oriented anchor zone 41 which is nested in the plate 21, together with an axially oriented fastening zone 40, so providing a device both for friction and for fastening the cover plate 26, in this example in a controllable manner.

In this region the dimensions of the damped flywheel are reduced because of the insert 41 and its zone 40, which enables the friction device 50 to be fitted without interfering with the gearbox casing.

In FIGS. 1 to 4, the stiffening member 60 carries at its outer periphery the rings 51, 52, 53, 54 of the friction device 50, the latter being fitted radially between its axially oriented outer peripheral flange and the edge of the outer periphery of the reaction plate 21. This device lies radially outwardly of the surface of the reaction plate which engages the friction liners of the friction disc 23.

The structures may of course be reversed.

Figure 5:
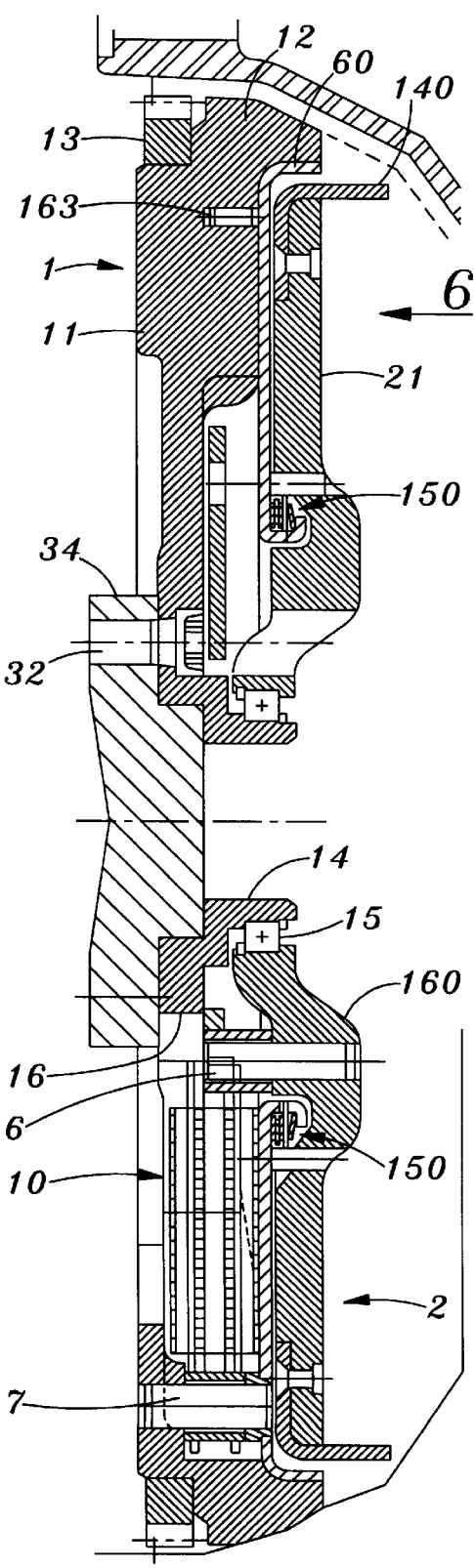
FIG. 5 is a view similar to FIG. 1, but showing a second embodiment by way of example.

Thus, in FIG. 5, the friction device 150 is located in the region of the inner periphery of the stiffening member 60, which in this case is secured by means of screws 1 63 on the skirt portion 12 of the plate 11.

To this end, the plate 21 has at its inner periphery a projecting element 160 which extends axially away from the plate 11.

The articulating means 6 are mounted on this projecting element 160.

As before, these articulating means 6 include a sleeve which is fixed by welding on to the damper plate 3, extending axially towards the projecting element 160.

Because of this projecting element, it is possible to extend the length of the sleeve.

In this example a plain bearing is interposed between the sleeve and the articulating pivot pin proper.

The stiffening member 60 has at its outer periphery an axially oriented flange which hugs the profile of the skirt portion 12.

Figure 7:
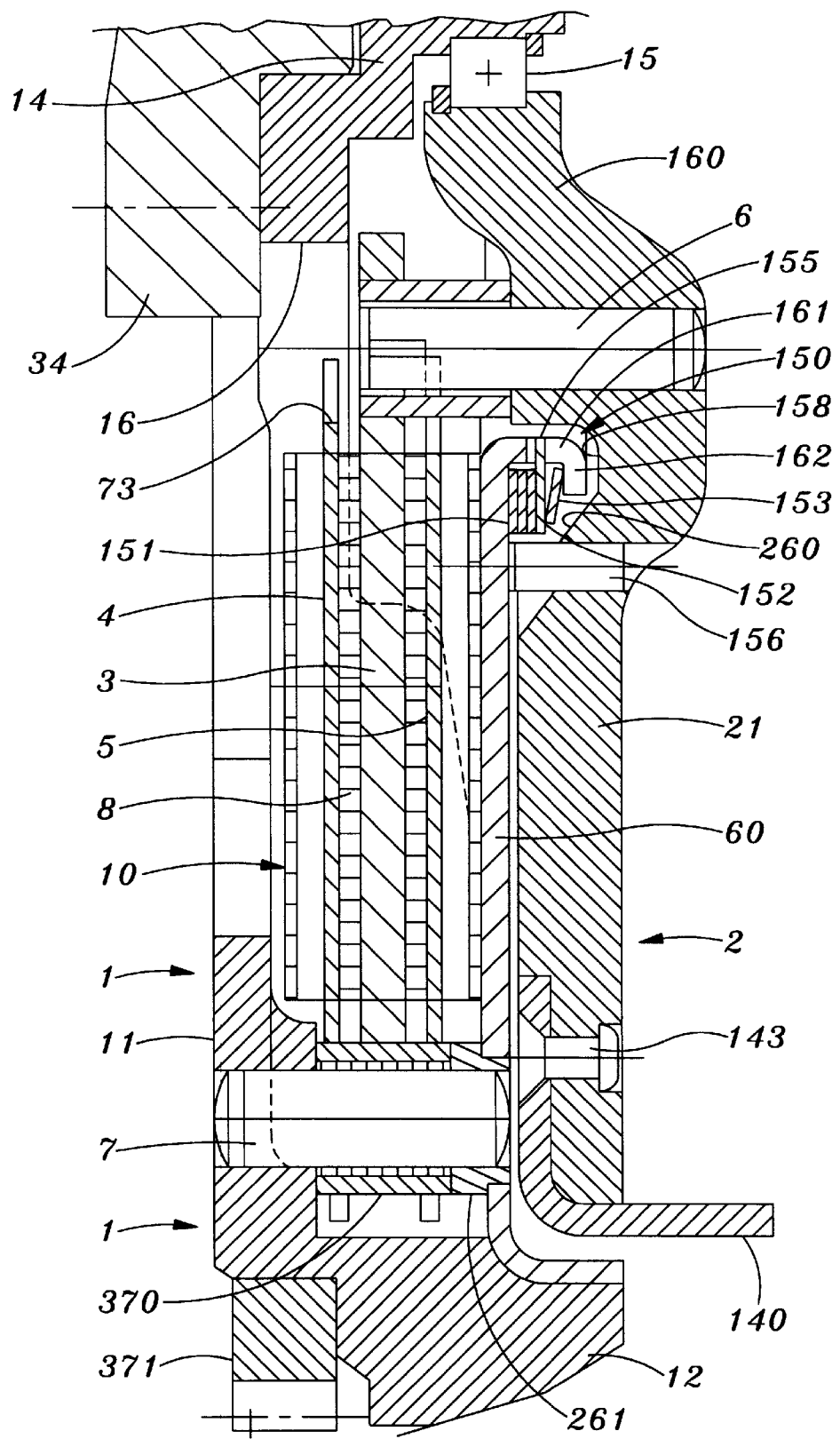
FIG. 7 is a view, on a larger scale, of the lower part of FIG. 5.
Figure 8:
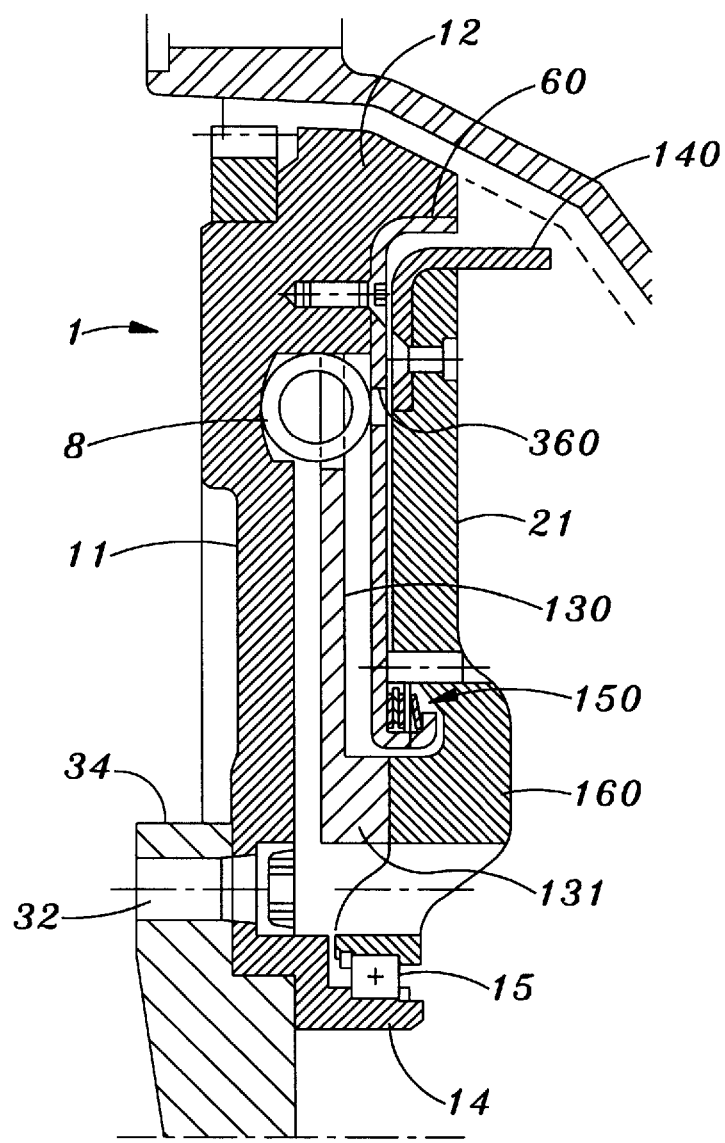
FIG. 8 is a view in axial cross section, but showing a third embodiment by way of example.

In FIGS. 3, 7 and 8, it will be noted that the member 60 is fixed on the outer surface of the skirt portion 12 that faces away from the plate 11, and that the member 60 hugs the said surface of the skirt portion, which, in a modification, may be a separate skirt attached to the plate 11, with the rivets of FIG. 1 then serving for the assembly of the said skirt and the said member 60 to the plate 11.

The said member 60 has at its inner periphery (FIG. 7) an axially oriented flange extending away from the plate 11.

This flange has slots 161 which constitute mortices, and at its free end it has lugs 1 62 which are initially aligned with the flange.

These lugs are arranged to be bent back, radially in this example, away from the axis of the assembly.

To this end, and as is lightly indicated in FIG. 7, weakening cuts are provided in order to facilitate the bending of the lugs 162. The same is true in FIG. 3.

Located between the inner periphery of the transverse portion of the member 60 and the lugs 1 62 there are, in axial succession, a friction ring 151, an application ring 152, and an axially acting resilient ring 153, which in this example is a Belleville ring and which bears directly on the lugs 162, so as to act on the application ring 152 and so that the friction ring 151 is gripped, as in FIG. 3, between the application ring 152 and the member 60.

The said application ring 152 has, at its inner periphery, lugs 155 constituting tenons and engaged in the mortices 161, optionally with a circumferential clearance.

The ring 151, which is preferably made of a mouldable material such as plastics material, has at its outer periphery slots 157 which are adapted to engage, with a clearance in this example, with dowels 156 carried by the reaction plate 21.

In a modification, the slots mesh with the dowels 156 without any clearance.

These dowels lie radially inwardly of the friction surface of the reaction plate 21 with which the friction liners of the friction disc 23 engage, with the reaction plate 21 carrying at its outer periphery an annular fastening member 140, which has an L-shaped cross section and which is secured to the reaction plate 21 by means of rivets 143.

Figure 15:
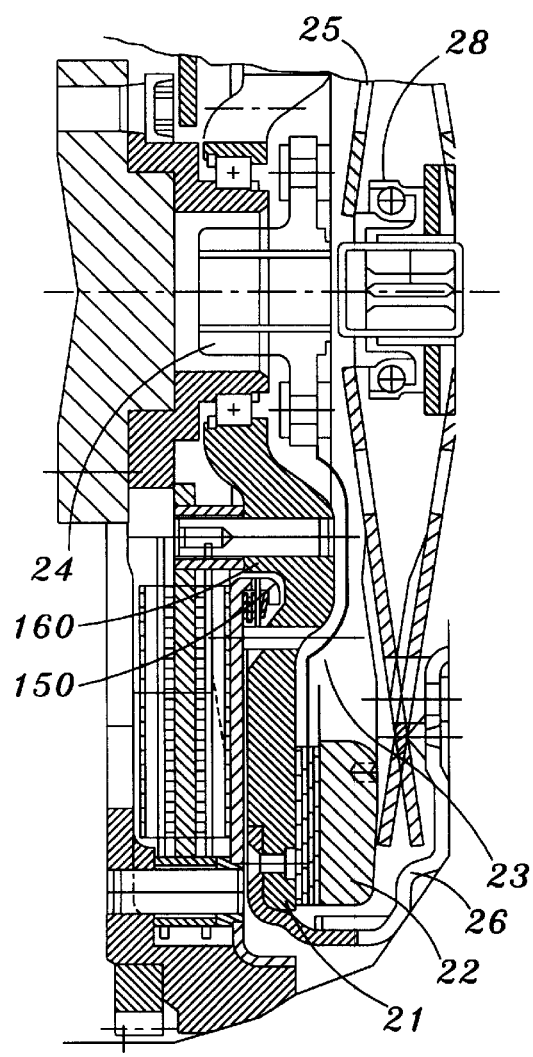
FIG. 15 is a half view similar to FIG. 5, but with the remainder of the clutch being included.

To this end, the surface of the reaction plate 21 that faces towards the plate 11 is recessed in order to accommodate the transverse portion of the member 140, the axial portion 140 of which serves for fastening of the cover plate of FIG. 1, from which the remainder of the clutch is omitted in the interests of simplification. However, it will be noted that the disc 23 is of cranked form so as to follow the profile of the projecting element and to extend around it as can be seen in FIG. 15, which also shows the clutch.

The hysteresis device 150 thus lies radially inwards of the friction surface (FIG. 15), and for this purpose the reaction plate 21 is recessed at 158, 260 in order to accommodate the rings 151, 152, 153 and the lugs 162.

An annular aperture is thus formed, with a base 158 which extends generally transversely, together with an inclined edge 260 which extends towards the plate 11.

The recess for accommodating the friction device 150 is bounded internally by an axially oriented flange. This recess, or hollow, is defined by the projecting element 160 in the surface of the plate 21 facing towards the plate 11.

Figure 6:
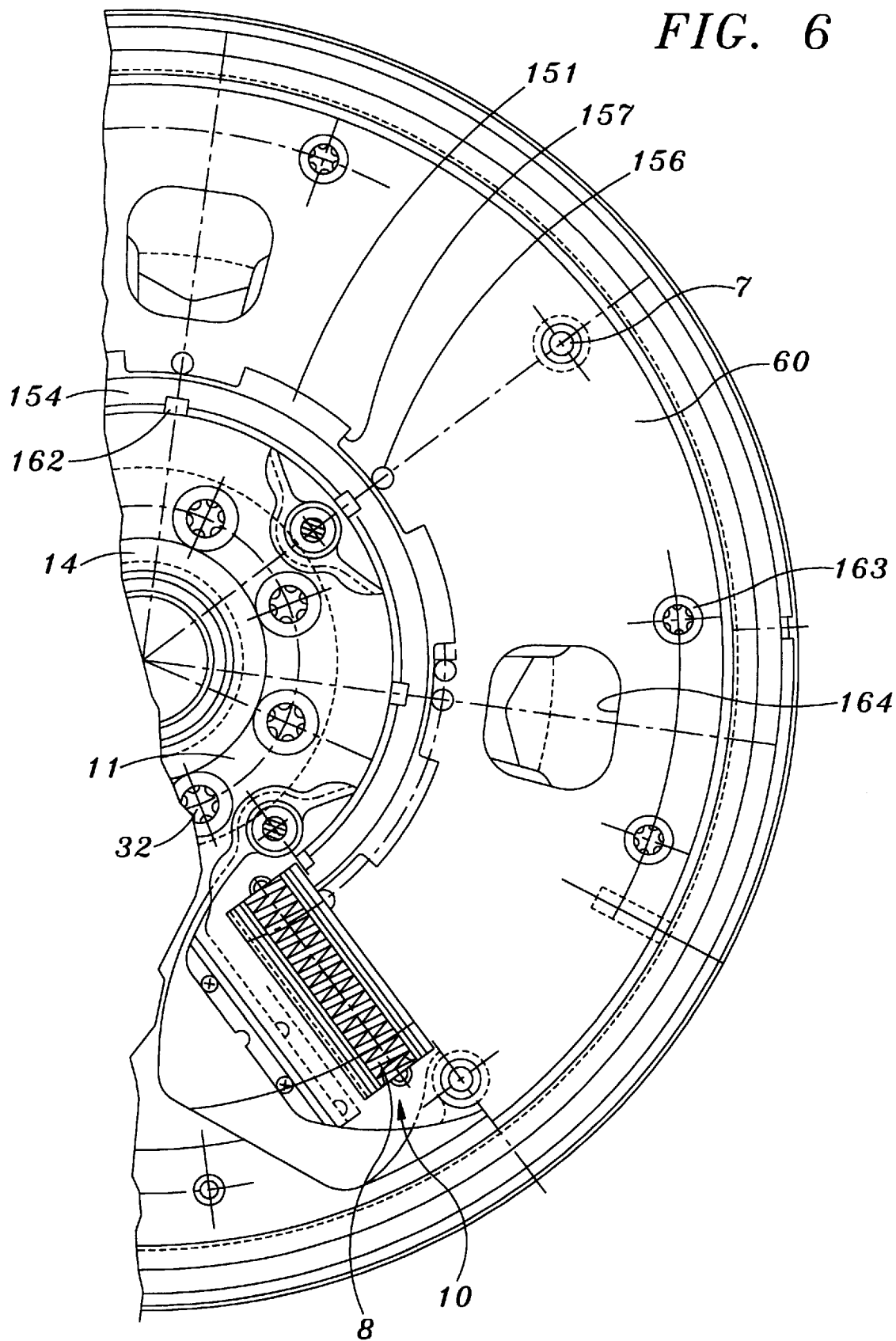
FIG. 6 is a partial view as seen in the direction of the arrow 6 in FIG. 5, the reaction plate 21 being omitted.

The stiffening member 60 enables the screws 32 to be tightened, and is formed with apertures 164 (FIG. 6) in order to assist ventilation.

With respect to the embodiment of FIG. 1, it will be appreciated that it is possible to augment the radial size of the reaction plate 21, and therefore its inertia.

The articulating means 7 comprise a pivot pin fitted into the plate 11 and into a bush 261 which is welded on to the member 60.

These articulating means also comprise a sleeve 370 which acts as a spacer between the bush 261 and the plate 11, and the sleeve 370 is mounted in corresponding holes formed in the guide members 4 and 5.

A plain bearing 371 is interposed radially between the pivot pin 7 and the sleeve 370 which is fixed to the members 4 and 5.

In both cases, the generally transversely oriented member 60 lies close to the plate 21 and has a double function, which is, firstly, that of providing friction for the device 50, 1 50, and secondly, a support function for the articulating means 7 which, in both cases, are fitted in the outer periphery of the said member 60. In both cases, the member 60 stiffens the mass 1, and defines, with the plate 11, a support in which the pivot pins 7 are mounted.

The resilient means 8 may be of course of the circumferentially acting kind, and may comprise resilient members which are interposed circumferentially between the two masses 1, 2.

Thus in FIG. 8, the member 60 has windows 360 for mounting within them circumferentially acting resilient members 8, the ends of which bear on the edges of the said windows and on shoulders formed in the mass 1, being defined by recesses formed in the latter.

A transversely oriented damper plate 130 is fitted axially between the plate 11 and the member 60, carrying at its inner periphery, as in FIG. 7, the rings of the friction device 150, with the reaction plate 21 having, as before, the projecting element 160 for the mounting of the friction device 150.

The damper plate 130 has a cross section which is generally L-shaped, and has at its inner periphery a flange 131 which extends axially towards the plate 21.

It is by means of this flange 131 that the damper plate 130 is fixed on to the projecting element 1 60, for example by riveting or by screws.

In the way known per se, this damper plate has at its outer periphery lugs which are arranged to act on the springs 8, which are of the coil spring type in this example.

The mass 1 is thus coupled elastically to the mass 2 through the springs 8 and the damper plate 130.

The axial portion 131 of the damper plate is fitted radially between the friction device and the through holes formed in the plate 21 so as to enable the screws 32 to be tightened.

Thus in every case (FIGS. 1 to 8), it is easily possible to tighten the screws 32, since the hysteresis device 50, 1 50 is not interposed axially at this level.

It is also possible to insert resilient means, acting either circumferentially or radially, due to the fact that the member 60 lies spaced axially away from the plate 11.

The present invention is of course not limited to the embodiment described.

Figure 9:
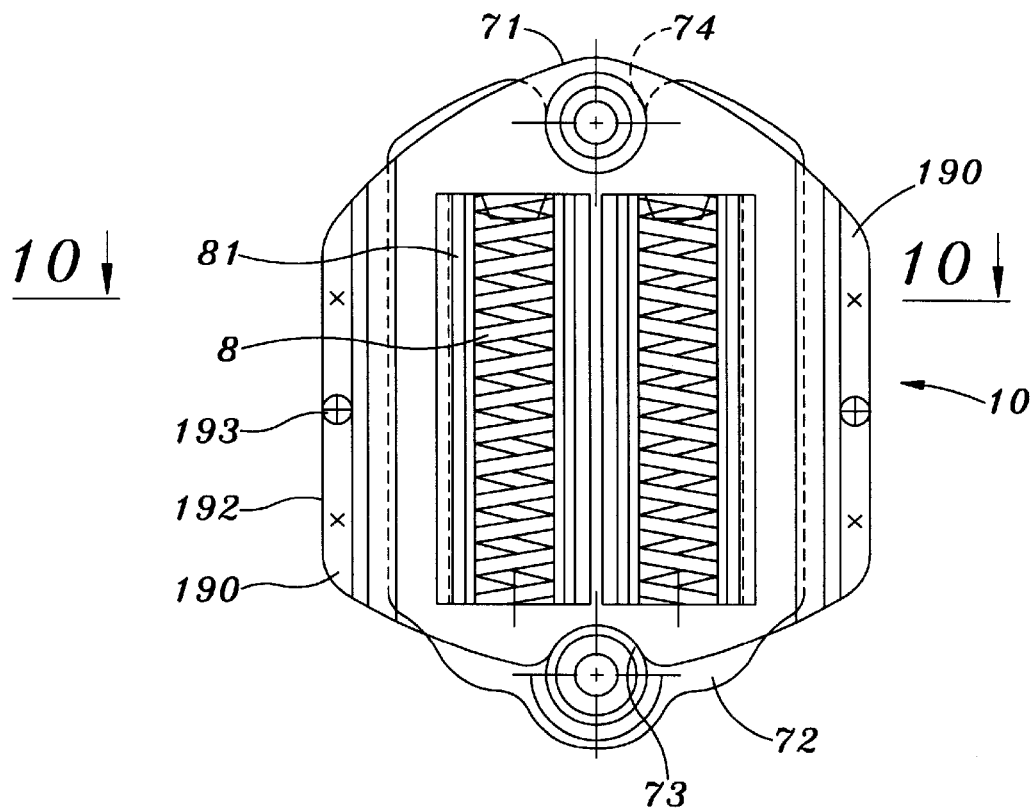
FIG. 9 is a front view of an articulated cassette, in a further embodiment by way of example.
Figure 10:
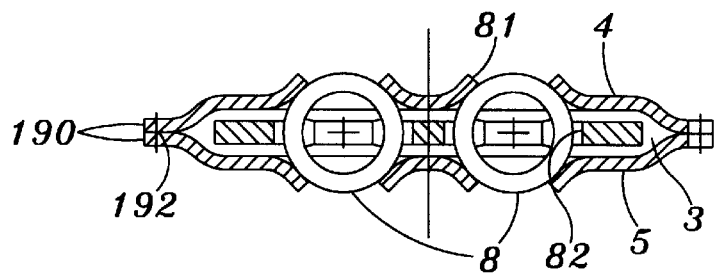
FIG. 10 is a view in cross section taken on the line 10—10 in FIG. 9.

Thus, in FIGS. 9 and 1 0, the guide members 4 and 5 have identical side edges 1 90 which are abutted on each other and spot welded together at points denoted 1 92, with centring pins 193 being inserted through the two flanges 190.

Figure 11:
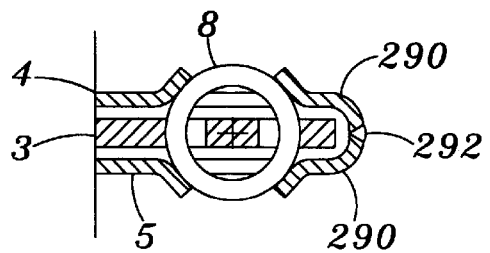
FIG. 11 is a half view in cross section, similar to FIG. 10 but showing another embodiment by way of example.

These flanges can of course be semicircular in form, as can be seen in FIG. 11 at 290, being welded as can be seen at 292.

Figure 12:
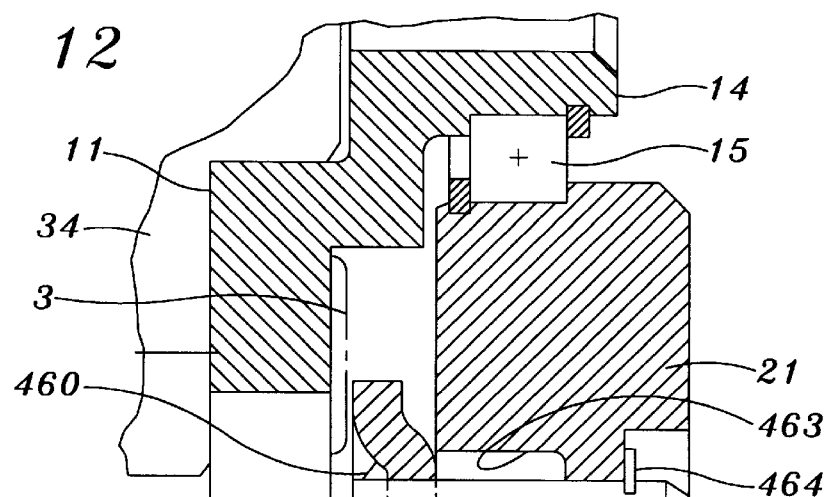
FIG. 12 is a partial view, in cross section, but showing another variant of the articulating means.

The first articulating means may comprise a pivot pin 6 (FIG. 12) which is welded at 460 to the damper plate 3, and which is articulated on the plate 21 through a transverse wall 461, which is formed within the thickness of the plate 21 between two communicating bores 462, 463 formed in the said plate 21.

In this way the pivot pin 6 is mounted for rotation in the bore of the wall 461.

A split ring 464 of the circlip type is fitted in the bore 462, in a groove of the pivot pin 6, for axial location of the said pivot pin.

Figure 13:
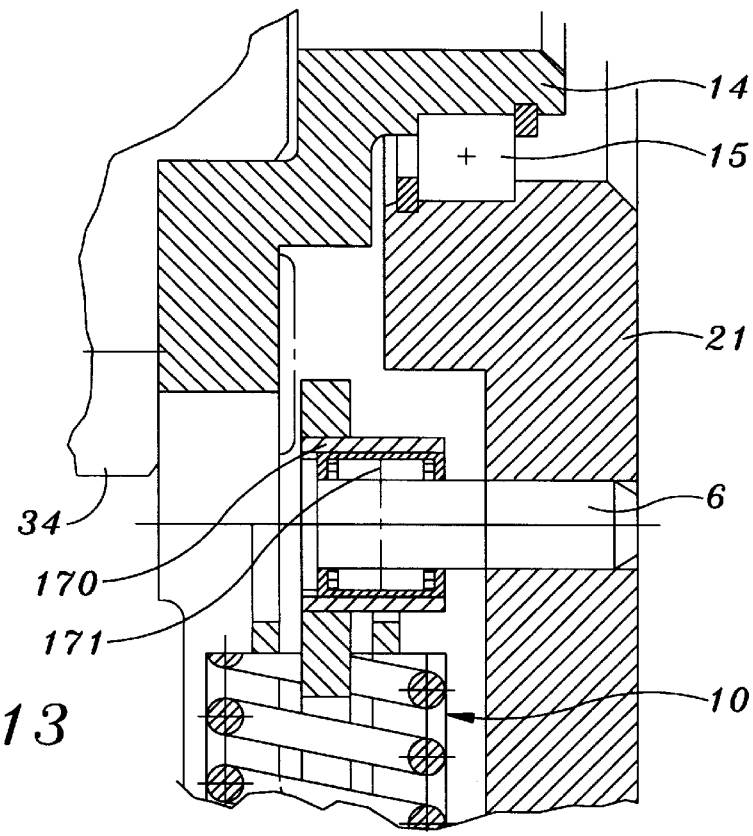
FIG. 13 is a view similar to FIG. 12, in yet another embodiment by way of example.

The damper plate 3 (FIG. 13) may of course be undeformed at its inner periphery for carrying the sleeve 170 that surrounds the needle bearing 171.

The clutch may of course be of the pull to release type, as described in the document FR-A-2 463 874 (U.S. Pat. No. 4,362,230).

The cover plate may be made of plastics material reinforced with fibres, for example glass fibres.

Figure 4:
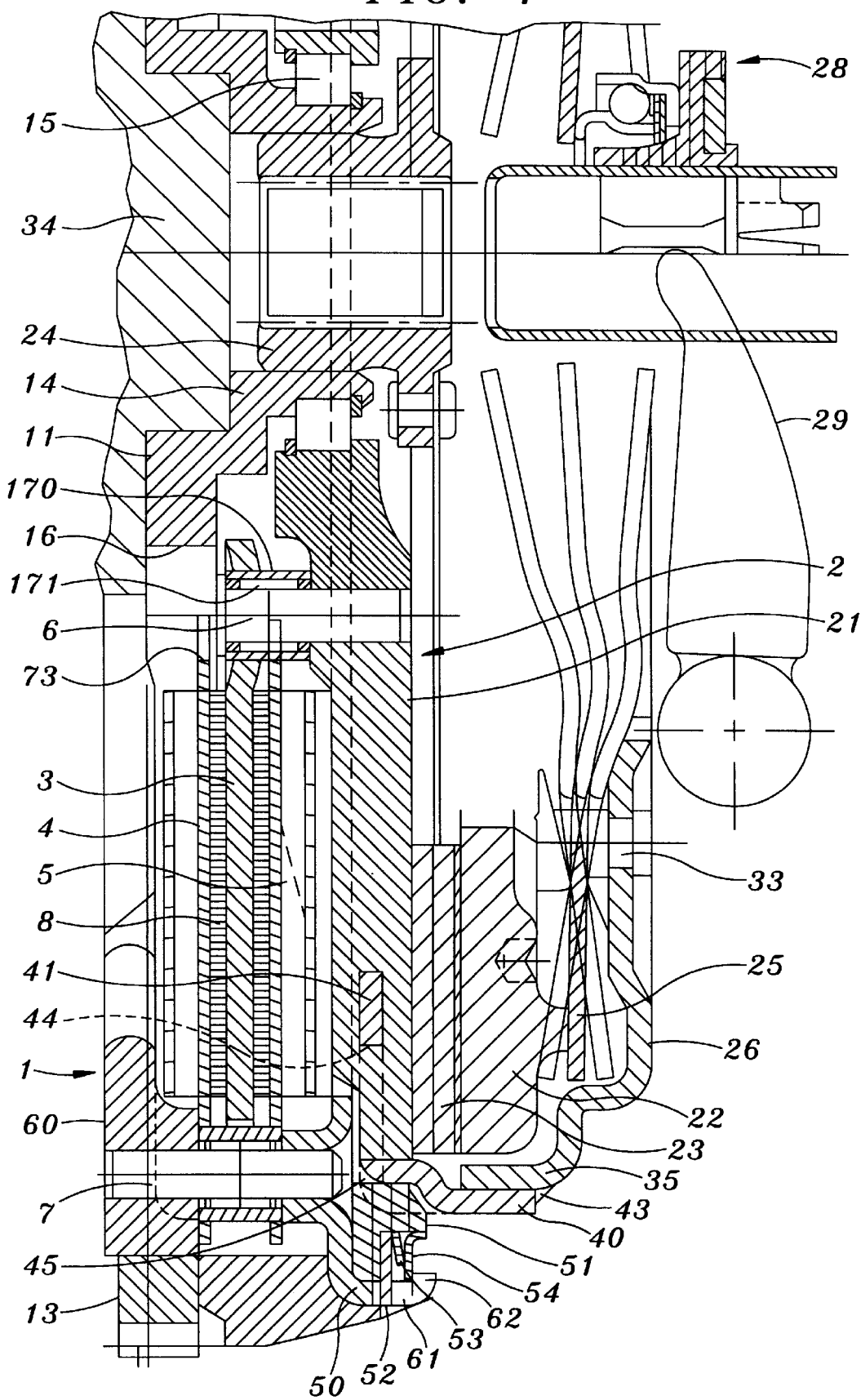
FIG. 4 is a view, on a larger scale, of the lower part of FIG. 1.

In a modification, the stub pieces 33 and the diaphragm 25 may be mounted outside the cover plate, as in FIG. 4 of the document FR-A-1 524 350.

In that case, the bosses presented by the pressure plate 22 for engagement by the diaphragm 25 extend through the cover plate, which is fixed, for example as in FIG. 7, by being welded on to the insert.

It will be appreciated that the rolling bearing 15 is of reduced size, and that it lies radially inwardly of the screws 32, which enables the length of the springs 8, and therefore that of the cassettes 10, to be increased.

In the drawings, in the rest position of the damped flywheel, the cassettes 10 are oriented radially, with the articulating means 6, 7 then being aligned on a common axis.

In a modification, in the said rest position, the cassettes 10 may be slightly inclined, with the articulating means 6, 7 then being offset both circumferentially from each other.

It is of course possible to reverse the structures, with the members 4, 5 being articulated at their inner periphery on the reaction plate 21, while the damper plate 3 is then articulated at its outer periphery on the plate 11, with the member 60 being interposed.

The bearing 15 may be interposed radially between an axially oriented flange, with which the plate 21 is accordingly provided at its inner periphery, and the hub 14. The outer ring of the rolling bearing 15 is then in contact with the hub 14, while the inner ring of the bearing 15 is in contact with the plate 21.

The closed holes 44 may be replaced with press formed portions, or with slits, or with lugs, preferably alternated with each other.

For example, in FIG. 1 the anchor portion 41 would then preferably have a first set of press formed portions directed towards the plate 11, and a second set of press formed portions directed axially towards the plate 22. It is of course equally possible to provide holes.

The holes may be replaced by open cut-outs formed in the edges of the insert.

In all cases, the insert is provided with deformations, which are either open (in the sense that the holes, the cut-outs, the slits and the lugs are open), or not open (i.e. the press formed portions), or both at once, for improved anchorage in the mass of the reaction plate.

As will be understood from the foregoing, the apertures 16 enable any interference between the cassettes 10 and the plate 11 to be avoided.

The said apertures 16 are accordingly disengagement apertures, which enable the axial size of the damped flywheel to be reduced.

As will have been understood, in the drawings the reaction plate 21 carries members 40 (FIG. 1), 140 (FIGS. 5 and 8), whereby the cover plate of the clutch can be fastened axially in such a way that it is spaced away from the reaction plate, with the said members having an axially extending portion for this purpose.

Thus, by contrast with the arrangement described in the document U.S. Pat. No. 5,120,276, the cover plate of the clutch has no radial flange for fastening it directly to the reaction plate.

It is therefore possible, within a given size, to fit the friction means in accordance with the invention at the outer periphery of the reaction plate (FIG. 1), or to increase the radial depth of the reaction plate (FIGS. 5 and 8), while having, in every case, a friction surface of the reaction plate which is of a maximised diameter, and the said surface can extend as far as the outer peripheral edge of the reaction plate 21.

The members 40, 41 may of course have at their free end a flange which is directed towards the axis of the assembly or away from the axis of the assembly, for fastening of the cover plate, which may have a peripheral fastening flange as in the document U.S. Pat. No. 5,120,276, the said cover plate then being flatter.

This cover plate may be simplified, and may consist of a plate welded on to the members 40, 140.

In a modification, the cover plate may be secured by seaming or by clip-type fastening on to the free end of the members 40, 140.

It is of course possible to fix the member 40 in FIG. 1 on to the reaction plate 21 in the same way as in FIG. 5.

We claim:

1. A damped flywheel of the kind which comprises two coaxial masses, (1,2) mounted for movement of one with respect to the others a resilient member (8) and friction devices (50, 150) are interposed operatively between said two coaxial masses (1, 2), in which one (1) of the masses, referred to as the first mass, is adapted to be secured to a driving shaft, while the other mass (2), referred to as the second mass, comprises a reaction plate (21) for a friction clutch and is mounted rotatably on the first mass (1) through an interposed bearing (15), wherein the first mass (1) carries a stiffening member (60) fixed to its outer periphery and lying close to the second mass (2), the friction devices (50, 150) are interposed operatively between one of the outer and inner peripheries of the stiffening member and the second mass (2), the stiffening member (60) includes at one of its inner and outer peripheries an axially oriented flange having lugs, bent back radially, at its free end, said flange is formed with slots (61, 161) defining mortices and at least one friction ring (51, 151) and an axially acting resilient ring (53, 153) are fitted between the lugs (62) and a transverse portion of the stiffening member, the friction ring (51, 151) is arranged to be mounted in rotation, optionally with a clearance, on the second mass (2), while the axially acting resilient ring (51, 151) bears directly or indirectly on the lugs (62) of the stiffening member so as to act on an application ring (52, 152) which has tenon engaging with the mortices (61, 161) in the axial flange of the stiffening member (60), so that the friction ring (51. 151) is gripped between the application ring and the transverse portion of the stiffening member (60).

2. A flywheel according to claim 1, wherein the friction devices work between the outer periphery of the stiffening member and the outer periphery of the reaction plate (21), and the reaction plate (21) carries an adaptor member (40, 140) which is formed with local pressed-out portions for engaging, with an optimal clearance, with bosses formed at the inner periphery of the friction ring (51).

3. A flywheel according to claim 2 wherein the adaptor member (40, 140) includes an axially oriented portion for fastening the cover plate of the clutch at an axial distance away from the reaction plate (21).

4. A flywheel according to claim 1, wherein, the friction device work between the inner periphery of the stiffening member (60) and a recess formed in a projecting element (160), which lies radially inwards of the surface provided on the reaction plate (21) for frictional engagement with the friction liners of a friction disc which is part of a friction clutch.

5. A flywheel according to claim 4, wherein, the friction ring (151) has slots (157) at its outer periphery, for engaging, with a clearance, with dowels (156) carried by the reaction plate (21).

* * * * *